US011290681B2

(12) United States Patent
Cope et al.

(10) Patent No.: US 11,290,681 B2
(45) Date of Patent: *Mar. 29, 2022

(54) SYSTEM AND METHODS FOR FACILITATING VIRTUAL PRESENCE

(71) Applicant: Nanolumens Acquisition, Inc., Peachtree Corners, GA (US)

(72) Inventors: Richard Craig Cope, Duluth, GA (US); Drew Fredrick Meincke, Woodstock, GA (US); Jorge Perez Bravo, Alpharetta, GA (US)

(73) Assignee: NanoLumens Acquisition, Inc., Peachtree Corners, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,838

(22) Filed: Nov. 2, 2020

(65) Prior Publication Data

US 2021/0051297 A1 Feb. 18, 2021

Related U.S. Application Data

(63) Continuation of application No. 16/654,786, filed on Oct. 16, 2019, now Pat. No. 10,827,150, which is a
(Continued)

(51) Int. Cl.
*H04N 7/14* (2006.01)
*G06F 3/14* (2006.01)
(Continued)

(52) U.S. Cl.
CPC .......... *H04N 7/147* (2013.01); *G06F 3/1454* (2013.01); *G09G 3/20* (2013.01); *G09G 3/32* (2013.01);
(Continued)

(58) Field of Classification Search
CPC ...................................................... H04N 7/14
See application file for complete search history.

(56) References Cited

U.S. PATENT DOCUMENTS 5,747,928 A 5/1998 Shanks et al.
5,821,688 A 10/1998 Shanks et al.
(Continued)

FOREIGN PATENT DOCUMENTS

WO 2002/043386 5/2002
WO 2009/105539 8/2009
WO 2013/074104 5/2013

OTHER PUBLICATIONS

Search Report and Written Opinion for PCT/US2011/061147 dated Jul. 3, 2012 (12 pages).
(Continued)

*Primary Examiner* — Olisa Anwah
(74) *Attorney, Agent, or Firm* — Troutman Pepper Hamilton Sanders LLP

(57) ABSTRACT

A virtual presence system includes a display having a structural matrix configured to arrange a plurality of spaced pixel elements. A plurality of spaced pixel elements collectively form an active visual area wherein an image is displayable. At least one image capture device is disposed within the active visual area for capturing an image. The system is able to sense the environment in front of the display and, in response to what is sensed, is able to change one or more attributes of a displayed image, or, is able to change the displayed image or a portion of the displayed image.

12 Claims, 13 Drawing Sheets

Related U.S. Application Data continuation of application No. 16/226,888, filed on Dec. 20, 2018, now abandoned, which is a continuation of application No. 15/988,428, filed on May 24, 2018, now Pat. No. 10,171,772, which is a continuation of application No. 15/262,507, filed on Sep. 12, 2016, now Pat. No. 9,986,203, which is a continuation of application No. 15/140,862, filed on Apr. 28, 2016, now Pat. No. 9,445,044, which is a continuation of application No. 13/297,784, filed on Nov. 16, 2011, now Pat. No. 9,330,589.

(51) Int. Cl.
*G09G 3/20* (2006.01)
*G09G 3/32* (2016.01)
*H04N 5/247* (2006.01)
*H04N 7/15* (2006.01)

(52) U.S. Cl.
CPC ............ *H04N 5/247* (2013.01); *H04N 7/142* (2013.01); *H04N 7/144* (2013.01); *H04N 7/15* (2013.01); *G09G 2300/0439* (2013.01)

(56) References Cited

U.S. PATENT DOCUMENTS

| | | | |
|---|---|---|---|
| 6,332,690 | B1 | 12/2001 | Murifushi |
| 6,819,045 | B2 | 11/2004 | Okita et al. |
| 6,974,971 | B2 | 12/2005 | Young |
| 7,242,398 | B2 | 7/2007 | Nathan et al. |
| 7,636,085 | B2 | 12/2009 | Yang |
| 7,710,370 | B2 | 5/2010 | Slikkerveer et al. |
| 7,714,801 | B2 | 5/2010 | Kimmel |
| 7,825,582 | B2 | 11/2010 | Furukawa et al. |
| 7,834,537 | B2 | 11/2010 | Kee et al. |
| 7,834,962 | B2 | 11/2010 | Satake et al. |
| 7,868,545 | B2 | 1/2011 | Hioki et al. |
| 7,977,170 | B2 | 7/2011 | Tredwell et al. |
| 8,023,060 | B2 | 9/2011 | Lin et al. |
| 8,096,068 | B2 | 1/2012 | Van Rens |
| 8,097,812 | B2 | 1/2012 | Wang et al. |
| 8,098,486 | B2 | 1/2012 | Hsiao |
| 8,228,667 | B2 | 7/2012 | Ma |
| 8,284,369 | B2 | 10/2012 | Chida et al. |
| 8,319,725 | B2 | 11/2012 | Okamoto et al. |
| 8,325,890 | B2 | 12/2012 | Price et al. |
| 8,456,078 | B2 | 6/2013 | Hashimoto |
| 8,471,995 | B2 | 6/2013 | Tseng |
| 8,477,464 | B2 | 7/2013 | Visser et al. |
| 8,493,520 | B2 | 7/2013 | Gay et al. |
| 8,493,726 | B2 | 7/2013 | Visser et al. |
| 8,654,519 | B2 | 2/2014 | Visser |
| 8,780,039 | B2 | 7/2014 | Gay et al. |
| 8,816,977 | B2 | 8/2014 | Rothkopf et al. |
| 8,873,225 | B2 | 10/2014 | Huitema et al. |
| 8,982,545 | B2 | 3/2015 | Kim et al. |
| 9,065,967 | B2 | 6/2015 | Hubner et al. |
| 9,071,809 | B2 | 6/2015 | Cope et al. |
| 9,117,384 | B2 | 8/2015 | Phillips et al. |
| 9,118,804 | B2 | 8/2015 | Kim et al. |
| 9,176,535 | B2 | 11/2015 | Bohn et al. |
| 9,286,812 | B2 | 3/2016 | Bohn et al. |
| 9,330,589 | B2 | 5/2016 | Cope et al. |
| 9,335,793 | B2 | 5/2016 | Rothkopf |
| 9,372,508 | B2 | 6/2016 | Wang |
| 9,459,656 | B2 | 10/2016 | Shai |
| 2004/0124763 | A1 | 7/2004 | Nathan et al. |
| 2005/0140665 | A1 | 6/2005 | Faris |
| 2006/0098153 | A1 | 5/2006 | Slikkerveer et al. |
| 2006/0170332 | A1 | 8/2006 | Tamaki et al. |
| 2006/0204675 | A1 | 9/2006 | Gao et al. |
| 2007/0001927 | A1 | 1/2007 | Ricks et al. |
| 2007/0002130 | A1 | 1/2007 | Hartkop |
| 2007/0146862 | A1 | 6/2007 | Moore et al. |
| 2007/0241002 | A1 | 10/2007 | Wu et al. |
| 2007/0258032 | A1 | 11/2007 | Kaihoko |
| 2008/0042940 | A1 | 2/2008 | Hasegawa |
| 2008/0218369 | A1 | 9/2008 | Krans et al. |
| 2009/0079813 | A1 | 3/2009 | Hildreth |
| 2009/0102763 | A1 | 4/2009 | Border et al. |
| 2009/0189917 | A1 | 7/2009 | Benko et al. |
| 2010/0302343 | A1 | 12/2010 | Bolle |
| 2011/0134144 | A1 | 6/2011 | Moriwaki |
| 2012/0002360 | A1 | 1/2012 | Seo et al. |
| 2012/0092363 | A1 | 4/2012 | Kim et al. |
| 2012/0194493 | A1 | 8/2012 | Soto |
| 2012/0293405 | A1* | 11/2012 | Iida .................. G06F 3/011 345/156 |
| 2012/0313862 | A1 | 12/2012 | Ko et al. |
| 2013/0100392 | A1 | 4/2013 | Fukushima |
| 2013/0272940 | A1 | 10/2013 | Cope et al. |
| 2015/0317121 | A1 | 11/2015 | Cope et al. |

OTHER PUBLICATIONS

International Search Authority, "International Search Report," PCT/US09/30040, dated Mar. 10, 2009.

International Search Authority, "Written Opinion," PCT/US09/30040, dated Mar. 10, 2009.

\* cited by examiner

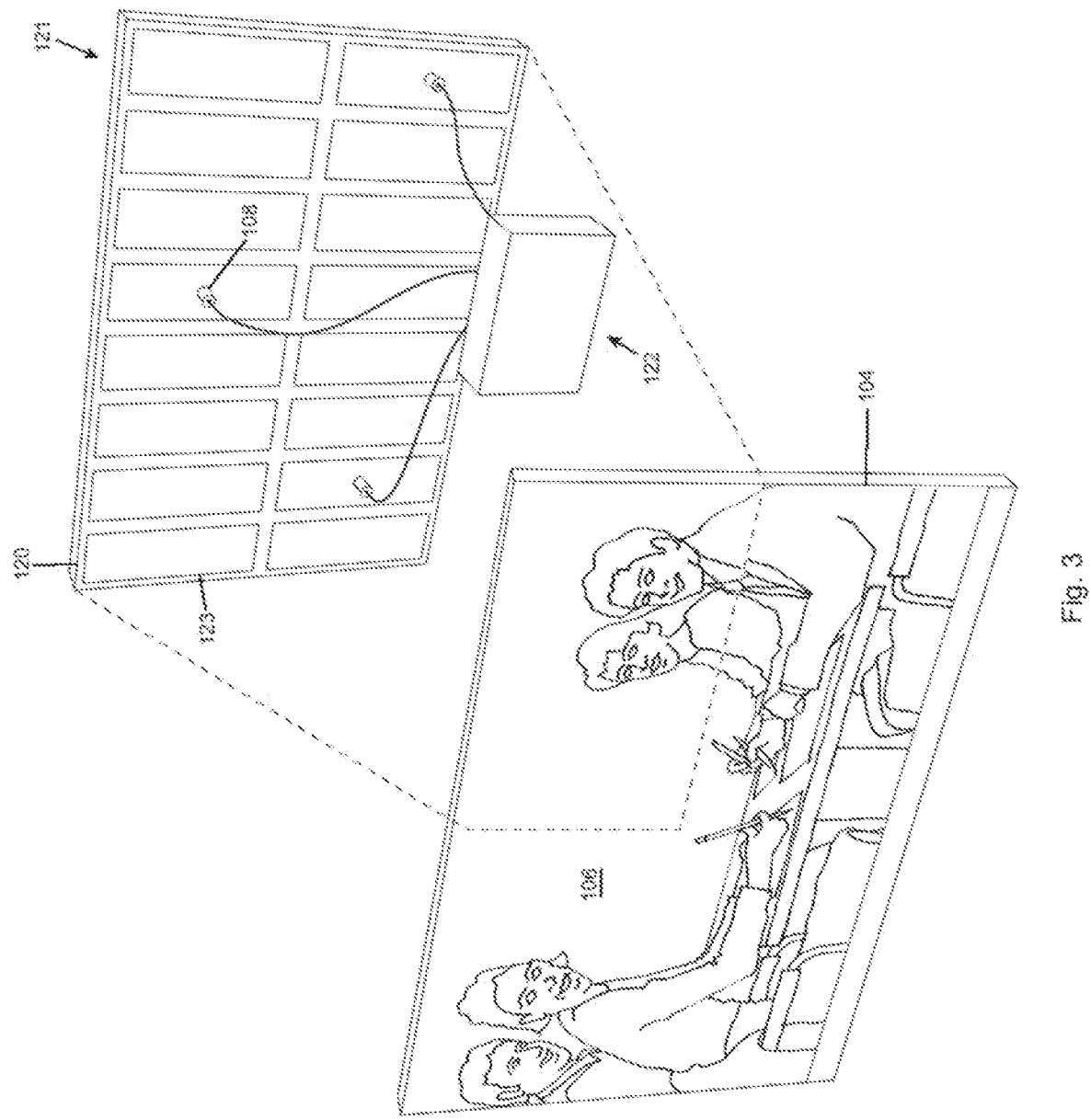

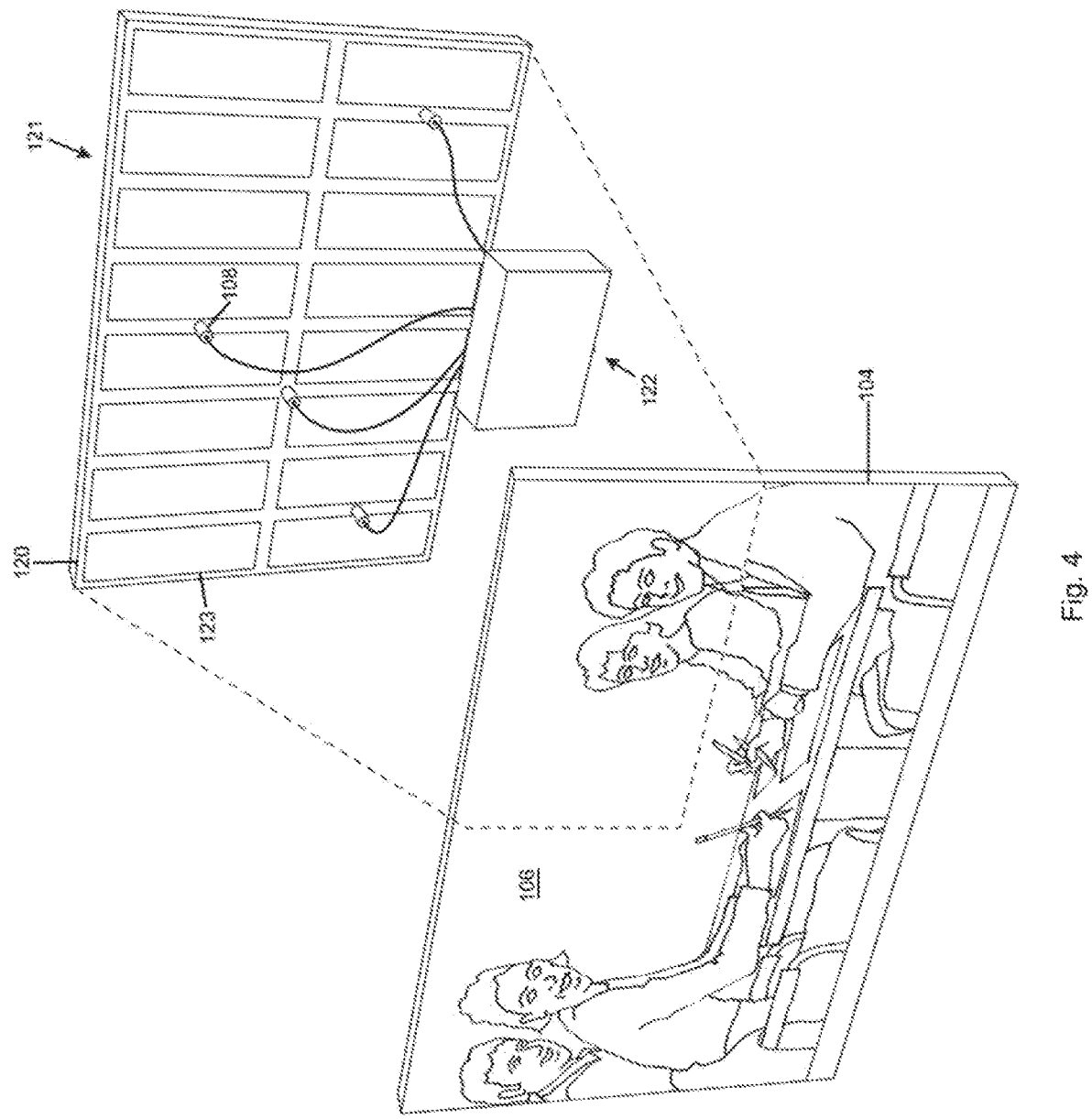

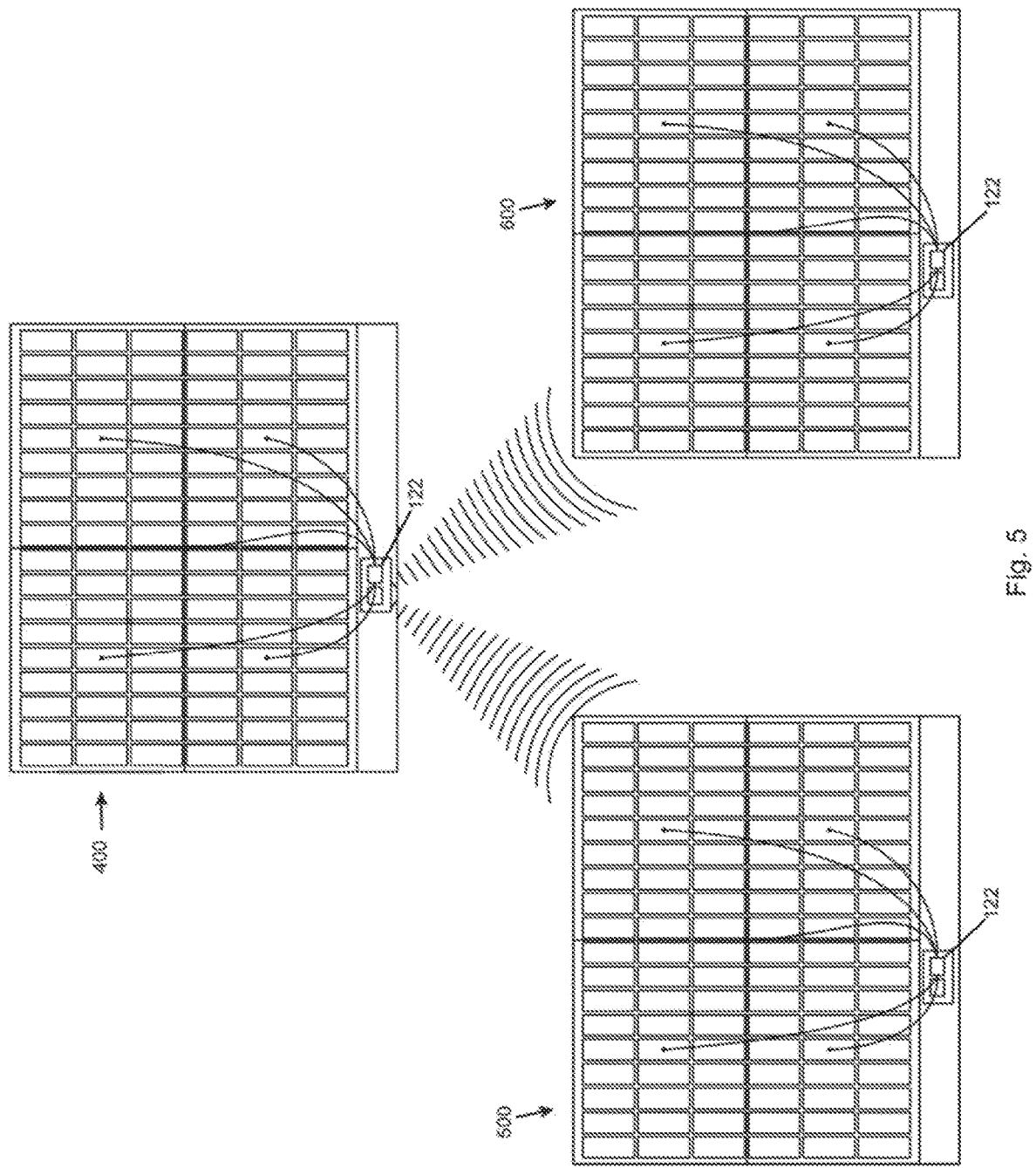

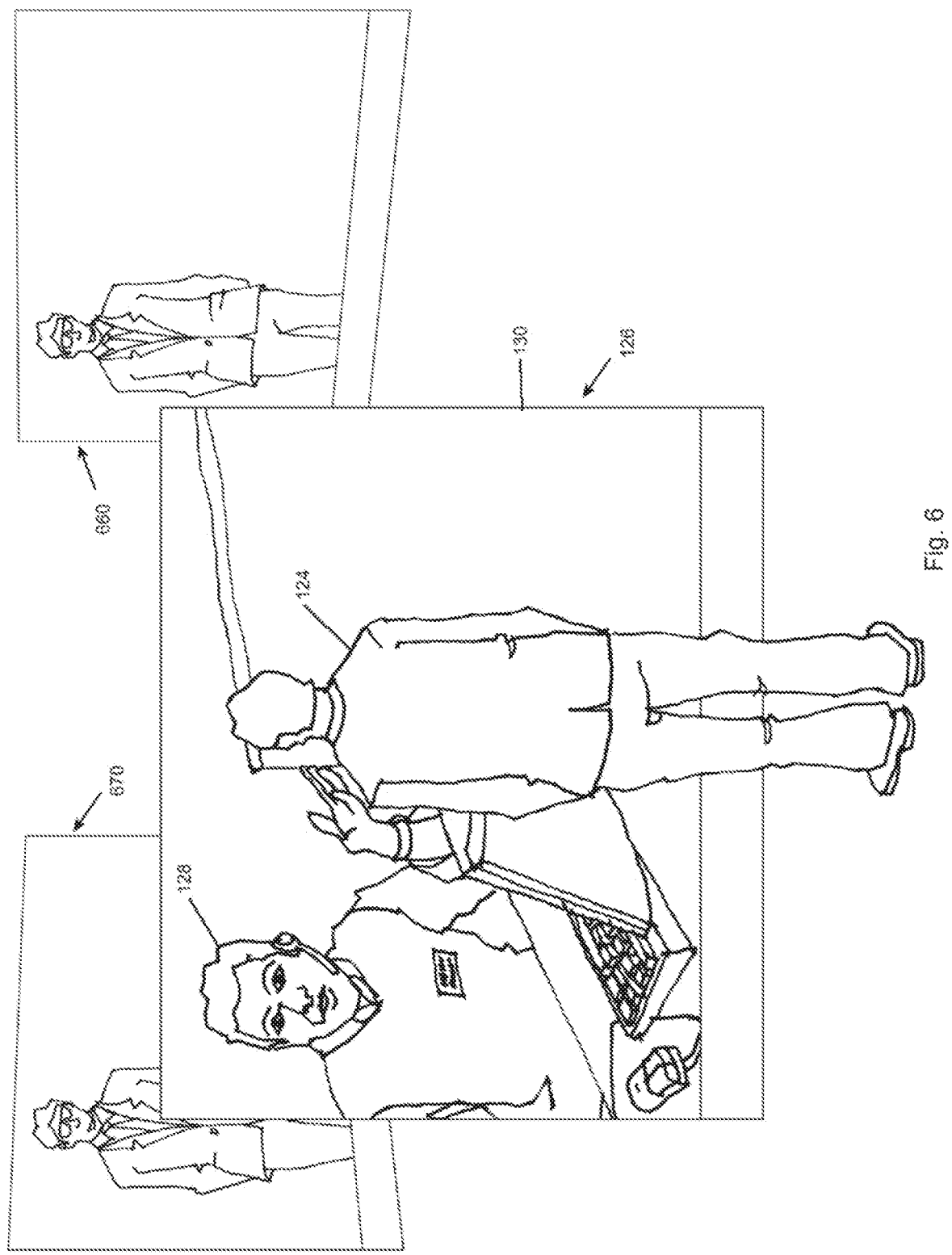

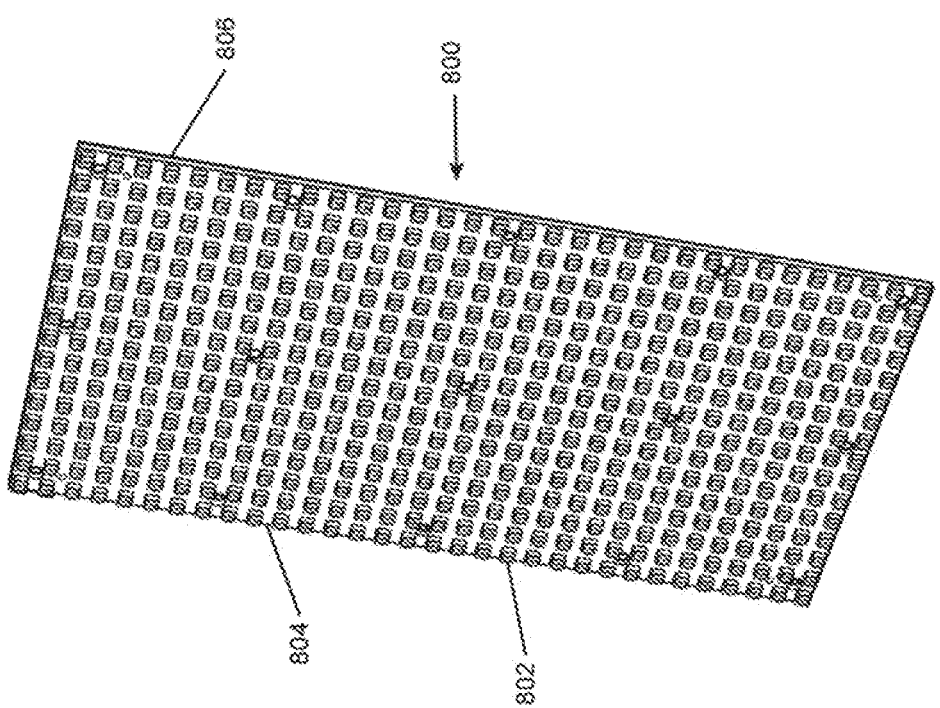

SYSTEM AND METHODS FOR FACILITATING VIRTUAL PRESENCE

CROSS REFERENCE TO RELATED APPLICATIONS

This non-provisional utility application is a continuation of and claims the benefit of application Ser. No. 16/654,786, filed Oct. 16, 2019, entitled "System and Methods for Facilitating Virtual Presence". Application Ser. No. 16/654,786 is a continuation of and claims the benefit of application Ser. No. 16/226,888, filed Dec. 20, 2018, entitled "System and Methods for Facilitating Virtual Presence". Application Ser. No. 16/226,888 is a continuation of and claimed the benefit of application Ser. No. 15/988,428, filed May 24, 2018, entitled "System and Methods for Facilitating Virtual Presence". Application Ser. No. 15/988,428 is a continuation of and claimed the benefit of application Ser. No. 15/262,507, filed Sep. 12, 2016, entitled "System and Methods for Facilitating Virtual Presence". Application Ser. No. 15/262,507 is a continuation of and claimed the benefit of application Ser. No. 15/140,862, filed Apr. 28, 2016, entitled "Methods for Facilitating Virtual Presence". Application Ser. No. 15/140,862 is a continuation of and claimed the benefit of application Ser. No. 13/297,784, filed Nov. 16, 2011, entitled "Systems for Facilitating Virtual Presence". Application Ser. Nos. 13/297,784, 15/140,862, 15/262,507, 15/988,428, 16/226,888, and 16/654,786 are incorporated herein by reference.

STATEMENT REGARDING FEDERALLY SPONSORED RESEARCH OR DEVELOPMENT

Not Applicable.

DESCRIPTION OF ATTACHED APPENDIX

Not Applicable.

FIELD OF THE INVENTION

This invention relates generally to a display system which provides for sensors located within a display's active image area for capturing data and information of objects before the viewing area for subsequent processing and more specifically to a video integration system for facilitating the display of real time images from a location to a remote location in a manner which accommodates the multi-positioning of individuals during the viewing time frame.

BACKGROUND OF THE INVENTION

Telepresence is a term which identifies the transmission of an image from a particular location to another viewing area in a real time manner. Telepresence is a rapidly growing technology sector including everything from a free Skype call using the camera in your laptop or on your PC to a Cisco Telepresence® system costing over $250,000. A telepresence system typically consists of computer hardware for telecommunications and affiliated software for interconnecting separate locations for operating a video conference system or other video presentation. Associated audio and video integration is typically utilized.

Cisco is one of the world leaders in telepresence and has a family of products that they are selling in the marketplace, some of which are as follows: Cisco TelePresence® System 3000 is the higher end version of Cisco TelePresence®, featuring three 1080p flat panel displays. The setup for the system includes tables, microphones, speakers, cameras, collaboration interfaces and lighting. This system includes a second row of tables, to allow up to 18 people in a single room. There are actually two rear row configurations; a twelve person configuration to allow up to eighteen people to be on-screen and, for smaller spaces, an eight person configuration to allow up to fourteen people to be on-screen. There are three 65" displays and a high fidelity audio system. Cisco TelePresence® System 1300 features a single 1080p flat panel display, but has a unique camera system that switches automatically to the active speaker. The Cisco TelePresence® 1300 Series seats up to 6 participants and consists of a single 65" display. Cisco TelePresence® System 1000 features a single 1080p flat panel display. Cisco TelePresence® System 500 features a complete 1080p system in a smaller form factor for small office applications to small conference rooms and includes a 37" LCD 1080p display and camera.

All of these systems contain at least one display either a LCD or plasma and one camera mounted generally above the display. The participants look at the displays to see the parties on the other side of the telepresence meeting and their image is captured by the camera located generally on top of the displays that their looking at. Such a configuration while suitable for its intended purpose has the potential for presenting a number of challenges that all users and systems face. There is a very small zone in which telepresence can occur because of the field of view of the camera. If during a telepresence session a person stands up it is possible that their head and upper body will be cut off from view, if they move laterally out of the field of view the camera they will disappear from the other person's view. Accordingly, telepresence today requires strict adherence to the narrow zone delineated by the type of camera used in the system. Furthermore, the cameras are located beyond the display's image area and may not provide an eye level presentation to a viewer.

A third constraint is that by using only one camera there is only one point of view for all the participants. If there is a display in front of you and you are viewing the participant on the display you are actually seeing that participant at an angle from the cameras perspective as opposed to a realistic head-on perspective that you would have if you are actually attending a meeting and sitting across the table from the other participant. These seemingly slight visual miscues create a restless and unnatural perspective while participating in the video conference.

SUMMARY OF THE INVENTION

A virtual presence system includes a display having a structural matrix configured to arrange a plurality of spaced pixel elements. A plurality of spaced pixel elements collectively form an active visual area wherein an image is displayable. At least one image capture device is disposed within the active visual area for capturing an image.

BRIEF DESCRIPTION OF THE DRAWINGS

For a fuller understanding of the invention, reference should be made to the following detailed description, taken in connection with the accompanying drawings, which are not drawn to scale, in which:

FIG. 3 is an upper perspective view of a back portion of the virtual presence system with an exploded view of a portion of the active visual area in accordance with an embodiment of the invention.

FIG. 4 is an upper perspective view of a back portion of the virtual presence system with an exploded view of a portion of the active visual area in accordance with an embodiment of the invention.

FIG. 5 is a perspective view of back portions of virtual presence systems in accordance with an embodiment of the invention.

FIG. 6 is a perspective view of front portions of virtual presence systems in accordance with an embodiment of the invention.

FIG. 8 is a virtual presence system in accordance with an embodiment of the invention.

DETAILED DESCRIPTION OF THE INVENTION

Figure 1:
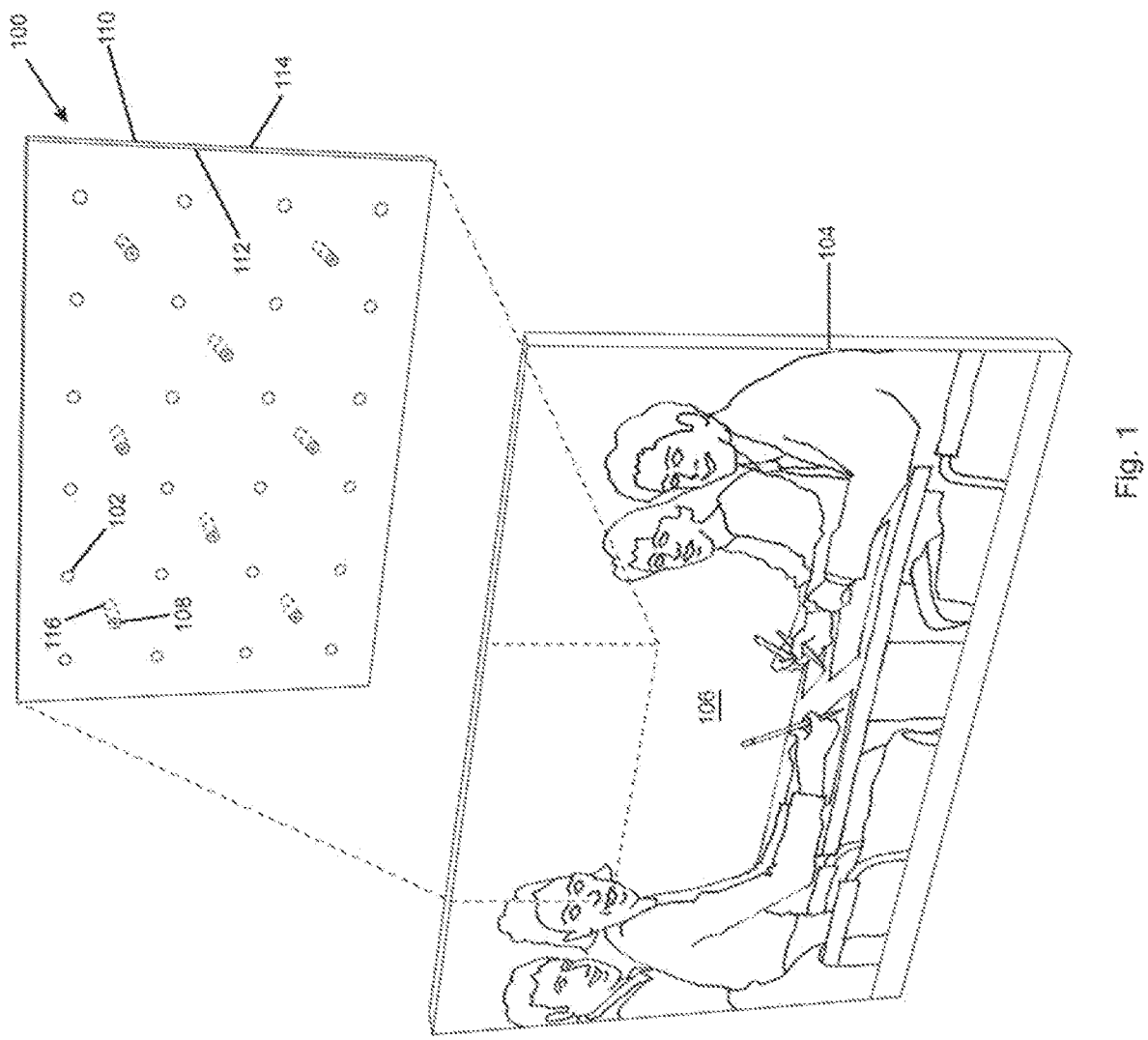
FIG. 1 is an upper perspective view of the virtual presence system with an exploded view of a portion of the active visual area in accordance with an embodiment of the invention.

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. Like numbers refer to like elements throughout.

Illustrative embodiments of the invention are directed to, among other things, systems and methods for facilitating virtual presence. Certain illustrative embodiments of the invention may be directed towards virtual presence systems comprising a display having an active visual area, at least one sensor device disposed within the active visual area, and at least one signal processor in communication with the at least one sensor device.

Certain illustrative embodiments of the virtual presence system may include a display having an active visual area comprising multiple imaging devices collectively forming an image, such as with many multi-monitor system or tiled displays, or multiple active visual areas collectively forming an image, such as with many JUMBOTRON® or similar video wall systems. The active visual area may include a single sensor device disposed within the active visual area or multiple sensor devices disposed within the active visual area. The type, number, and position of the sensors may vary depending on the application. In the preferred embodiment, the sensors are populated at varying heights and widths within the active visual area.

In some aspects, the sensor devices may include receiving capabilities and/or emitting capabilities. Accordingly, as a user or object moves about the active visual area, at least one of the sensor devices may emit and/or receive information associated with the user or object as it moves. For example, in an embodiment with multiple sensor devices, as an object moves about a room in front of the active visual area, the amount of information associated with that object that is collected by any given sensor device may change.

The virtual presence system may include at least one signal processor in communication with the sensor devices. The signal processor may be configured to perform one or both of: (i) receive information from one or more of the sensor devices having receiver capabilities; and/or (ii) deliver information for transmission via one or more of the sensor devices having emitter capabilities. For example, where two or more sensor devices comprise cameras, the received information from each camera may represent a respective sub-image captured by the respective camera. The sub-images may then be combined by the signal processor to form a larger single image. The larger single image may be presented on the active visual area itself to create a mirror effect or at a remote location to create a window effect.

In certain illustrative embodiments, by having one or more sensor devices disposed at multiple locations within the active visual area, a user is able to look and talk directly into the active visual area at multiple locations as a switching device selects the most suitable sensor device. In one embodiment, a mirror image may be presented back on the active visual area or on another display having an active visual area. This eliminates many of the shortcomings of the prior art associated with telepresence. For example, in accordance with an embodiment of the invention, users are able to look directly at each other on the active visual area as if they were talking face-to-face.

Embodiments of the virtual presence system will now be discussed in more detail. It will be appreciated that one or more sensor devices may be disposed at any location within the active visual area. It will also be appreciated that one or more sensor devices may be disposed at any locations within the active visual area comprised of a single display element (as with most computer monitors or televisions), multiple display elements (as with an LED type display), and/or tiled displays. It will further be appreciated that the virtual presence system described above may be embodied in many variations without departing from embodiments of the invention. For example, the virtual presence system may include LED type displays, OLED-type displays, LCD-type displays, or plasma-type displays, etc. Moreover, the virtual presence system may include a flexible display, a rigid display, or any other display known in the art.

In one embodiment, as depicted in FIG. 1, the virtual presence system 100 may include a plurality of spaced pixel elements 102 collectively forming an active visual area 104 or a portion thereof. The pixel elements 102 may comprise, for example, LED's, OLED's, and/or LCD's, etc. The spaced pixel elements 102 are spaced apart and receive image date for collectively forming an image 106 on the active visual area 104 when viewed as a whole. One or more sensor devices 108 are respectively disposed amongst or between the spaced pixel elements 102. Preferably the spaced pixel elements 102 have a pixel gap of equal spacing between the various pixels for providing a uniform presentation which facilitates off-axis viewing.

Still referring to FIG. 1, the spaced pixel elements 102 are supported by a substrate 110. The substrate 110 includes a front surface 112 and a back surface 114 defining a thickness. The pixel gap is such that the spacing between adjacent pixels located on a particular substrate is equivalent to the spacing between adjacent pixels located on adjacent substrates in both the vertical and horizontal direction. Sensor devices 108 are preferably disposed within the active visual area 104 between the spaced pixel elements 102 and associated with respective apertures 116 (depicted in phantom lines) in the thickness of the substrate 110. For example, the sensor devices 108 may be disposed partially or entirely within an associated aperture 116. The sensor devices 108 may also be disposed on the front surface 112 of the substrate 110 among or between the spaced pixel elements 102. Any part of the sensor device 108 mounted on the front surface 112 of the substrate 110 and/or any leads or wiring associated with the sensor devices 108 may be received, at least in part, in the aperture 116 of the substrate 110. Sensors 108 preferably populate the active visual area at multiple locations with different vertical and lateral coordinates. In this manner the sensor capturing capabilities are utilized for capturing information disposed before the entire active visual area. Preferably the sensor capturing capabilities provide a sensor capture area at least equal to the active visual area however it is possible that with sensors located near the periphery of the of the active visual area that the sensor capture area includes the capturing of information from an area which is located beyond the periphery of the active visual area.

Figure 2:
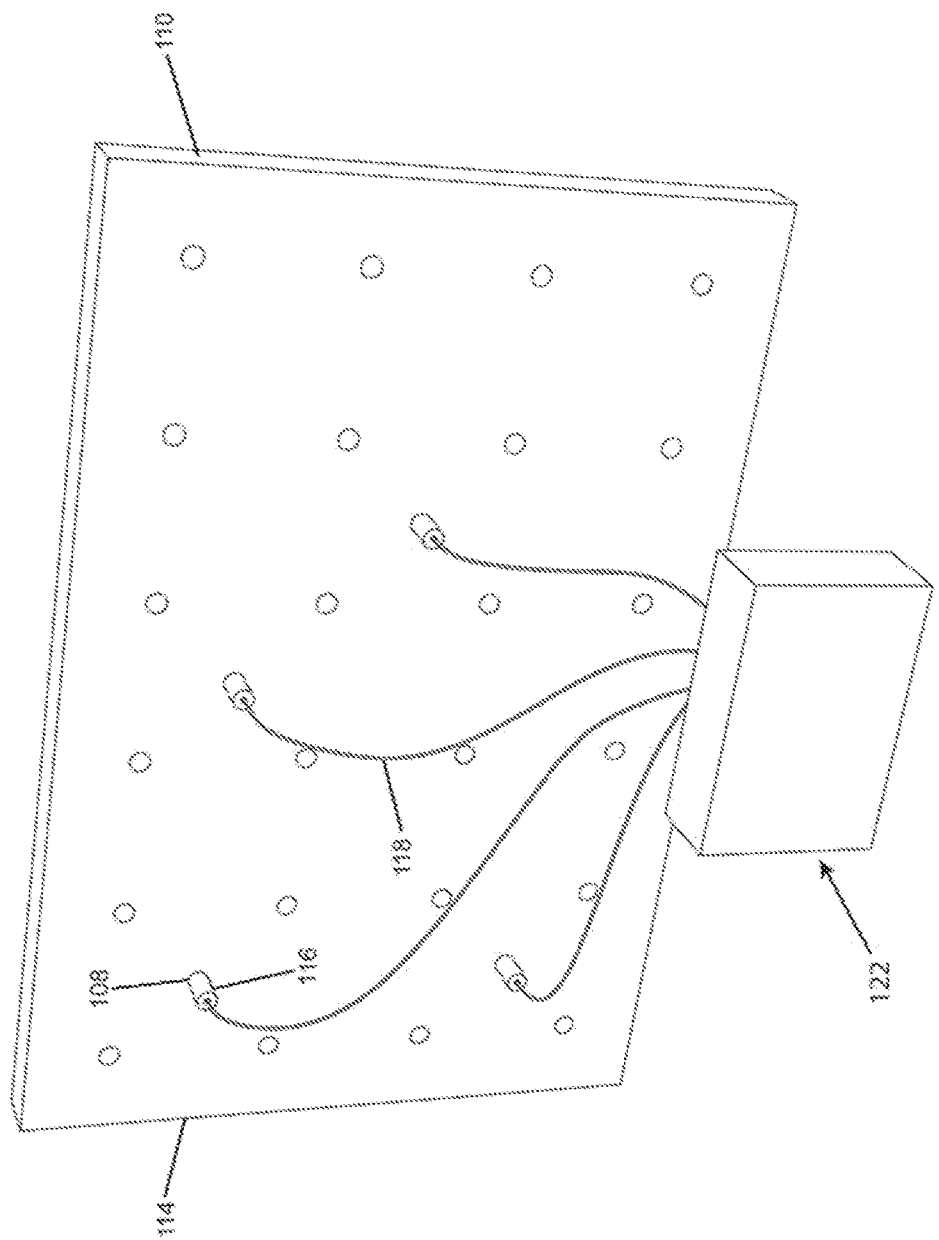
FIG. 2 is an exploded view of a back portion of the virtual presence system in accordance with an embodiment of the invention.

As depicted in FIG. 2, the sensor devices 108 may be disposed on the back surface 114 of the substrate 110 and receive or emit data through the apertures 116. In one embodiment, the sensor devices 108 may have lenses that are at least partially received in the apertures 116. Any leads or wiring 118 associated with the sensor devices 108 mounted on the back surface 114 of the substrate 110 may be partially or entirely disposed within an associated aperture 116 or partially or entirely disposed on the back surface 114 of the substrate 110.

In another embodiment, as depicted in FIG. 3, the virtual presence system 100 may include a plurality of display elements 120 collectively forming an active visual area 104. The active visual area 104 may generate an image 106. Each of the display elements 120 further comprises a plurality of spaced pixel elements, such as spaced pixel elements 102 in FIG. 1. One or more sensor devices 108 are respectively disposed within one or more of the display elements 120, with the sensor devices 108 being further disposed between one or more of the spaced pixel elements of one or more of the display elements 120. The arrangement of the sensor device in this embodiment is similar to the arrangement in FIG. 1; however, the spaced pixel elements 102 are grouped together to form a display element 120, and the display elements 120 are grouped together to form an active visual area 104 and image 106.

Still referring to FIG. 3, the active visual area 104 may include a structural matrix 121 configured to arrange the display elements 120 in a configuration to provide the active visual area 104. Moreover, the display elements 120 may include a structural sub-matrix 123 configured to arrange the spaced pixel elements 102 in a configuration to provide the display elements 120. The structural matrix 121 and the structural sub-matrix 123 may be independent of one another or integrated.

In yet another embodiment, as depicted in FIG. 4, the virtual presence system 100 may include a plurality of display elements 120 collectively forming a single active visual area 104. The active visual area 104 may generate an image 106. One or more sensor devices 108 are respectively disposed amongst or between one or more of the respective display elements 120. In this embodiment, the display elements 120 include a plurality of spaced pixel elements, such as the spaced pixel elements 102 in FIG. 1. The active visual area 104 may include a structural matrix 121 configured to arrange the display elements 120 in a configuration to provide the active visual area 104. Moreover, the display elements 120 may include a structural sub-matrix 123 configured to arrange the spaced pixel elements 102 in a configuration to provide the display elements 120. The structural matrix 121 and the structural sub-matrix 123 may be independent of one another or integrated, and/or may be of rigid and/or pliable construction. Because the sensor devices 108 are disposed among or between the display elements 120, individual display elements 120 are capable of being removed and replaced without having to remove the sensor devices 108.

In one embodiment, the sensor devices may include receiving capabilities. Accordingly, the sensor devices may include suitable means for collecting data related to light (visible and/or invisible), acoustics, energy (electrical, magnetic, and/or radiation), or any other signals, frequencies, measurable properties, or combinations thereof. For example, the sensor devices having receiving capabilities may comprise, but is not limited to, a sensor, a camera, a microphone, an infrared camera, a night-vision camera, a UV sensor, a light sensor, and/or movement sensor, etc. In another embodiment, the sensor devices may include emitting capabilities. Accordingly, the sensor devices may include any means for transmitting data related to light (visible and/or invisible), acoustics, energy (electrical, magnetic, and/or radiation), or any other signals, frequencies, transmittable properties, or combinations thereof. For example, the sensor devices having emitting capabilities may comprise, but is not limited to, a sensor, a speaker, a laser, an RF emitter, and other optical and audio emitters, etc. Moreover, the sensor devices may include both receiving capabilities and emitting capabilities, such as, but not limited to, sound navigation and ranging (SONAR). The type, number, and position of the sensor devices may vary depending on the application. In view of certain applications, the sensors are utilized for capturing information which may be processed and determine that movement exists by an entity located within the vicinity of the active display area. By detecting movement certain actions may be undertaken with the images displayed.

Referring to FIGS. 2-4, the virtual presence system 100 may include at least one signal processor 122 in communication with the sensor devices 108. The signal processor 122 is configured to perform one or both of: (i) receive information from one or more of the sensor devices 108 having receiving capabilities; and/or (ii) deliver information for transmission via one or more of the sensor devices 108 having emitting capabilities. The signal processor may be independent of the virtual presence system or integrated within the virtual presence system. Moreover, the signal processor may comprise a CPU, a digital signal processor, a remote network, a network processor, and/or any data processor. In one aspect, the signal processor may receive or transmit a variety of information from the sensor devices. For example, where the sensor devices comprise two or more cameras, the received information from each of the sensor devices may represent a respective sub-image captured by the respective sensor device. The plurality of sub-images may then be combined by the signal processor to form a larger single image. The larger image may then be displayed on the active visual area to create a mirror effect or displayed at a remote active visual area to create a window effect. The communication between the sensor devices and the signal processor(s) may include wired or wireless communication.

The combining of sub-images, also referred to as image stitching, is the process of combining multiple images with overlapping fields of view to produce a larger single image. The signal processor may include any means known in the art for combining or stitching multiple sub-images together to form one larger image. For example, U.S. Pat. Nos. 7,894,689; 7,006,111; 7,058,239; 5,990,904; and 7,778,491 all describe different means for stitching an image and are all herein incorporated by reference. Moreover, programs for combining or stitching images include AUTOSTITCH®, HUGIN®, PTGUI®, PANORAMA TOOLS®, MICROSOFT RESEARCH IMAGE COMPOSITE EDITOR®, CLEVR STITCHER®, and ADOBE SYSTEMS PHOTOSHOP®.

The signal processor may also perform additional manipulations of the data received from the sensor devices. For example, with regards to images, the signal processor may manipulate magnification, color, contrast, brightness, and/or sharpness etc., or appropriately compensate for differences in the lighting level in the environment. Similarly, with regards to acoustics, the signal processor may manipulate tone, volume, and/or pitch etc. It should be appreciated, however, that other manipulation of data may be possible depending on the media.

As depicted in FIG. 5, the signal processors 122 of the virtual presence systems 500 and 600 may be in communication with other virtual presence systems 400. The communication between the signal processors may be over wired and/or wireless connections and networks, such as anyone or combination of the Internet, cellular, WAN, WWAN, LAN, WLAN, WPAN, etc. Thus, information received from the sensor devices having receiver capabilities may be processed and transmitted to other virtual presence systems where the information is presented on other active visual areas. Likewise, information received by the signal processor from other virtual presence systems may be transmitted to and displayed on the active visual area.

An illustrative embodiment for using the virtual presence system for telepresence is depicted in FIG. 6. A first user 124 stands in front of the active visual area 130 of a first virtual presence system 126 and views a second remote user 128 on the active visual area 130 of the first virtual presence system 126. The second remote user 128 is positioned in front of a second virtual presence system and views the first user 124 on the active visual area of the second virtual presence system. As described above, one or more sensor devices are disposed within the active visual area 130 of the first virtual presence systems 126 for processing information such as an image from the sensor capture area. The sensor devices may, for purposes of this example, include one or more cameras. The first user 124 and the second user 128 then speak directly to the image of the other. Because the sensor devices are disposed within the active visual areas of the virtual presence systems, the first user 124 and second user 128 are able to speak to each other as if they were fact-to-face. For example, multiple cameras may be placed within the active visual area 130 in order to accurately capture all users or be switched to capture the speaker at that moment. The cameras may be spaced apart at various widths and heights in order to provide face-to-face viewing of seated and standing users, including users of different heights. The sensor devices receive images within their respective field of views. The images from all sensor devices may be processed by the signal processor and combined or stitched together to create a single image for an active visual area. The single image may then be displayed on the active visual area 130 to create a mirror effect or at a remote active visual area 660,670 to create a window effect.

In one embodiment, the sensor devices include cameras positioned within the active visual area. A variety of cameras may be used including wide angle lenses, fish eye lenses, normal lenses, and/or any other angle of view. Light shields may also be incorporated into the cameras to guard against backlight from the display. Moreover, specific cameras may be turned on or off depending on the need, such as resolution, energy consumption, and/or temperature control. As discussed above, the images from all sensor devices may be processed by an associated signal processor and combined or stitched together to create a single image for an active visual area. The single image may then be displayed on the active visual area to create a mirror effect or at a remote active visual area to create a window effect.

In one embodiment, the sensor devices may include one or more microphones and/or speakers positioned within the active visual area. This provides location-specific sound and also allows users to speak toward the active visual area furthering the face-to-face impression. In another embodiment, the one or more of the sensor devices of the virtual presence system may include visual, acoustic, and/or infrared capabilities, or any combination thereof.

Figure 7B:
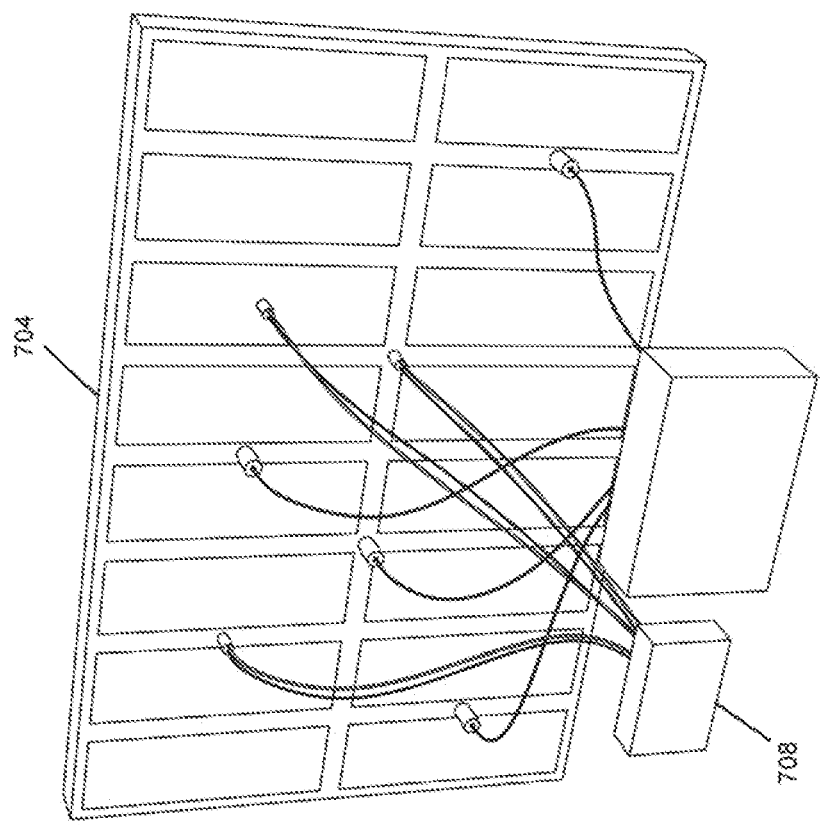
FIG. 7A and FIG. 7B are views of a virtual presence system including a sensor device having both emitting and receiving capabilities, FIG. 7A being a side view, FIG. 7B being a back perspective view.
Figure 7A:
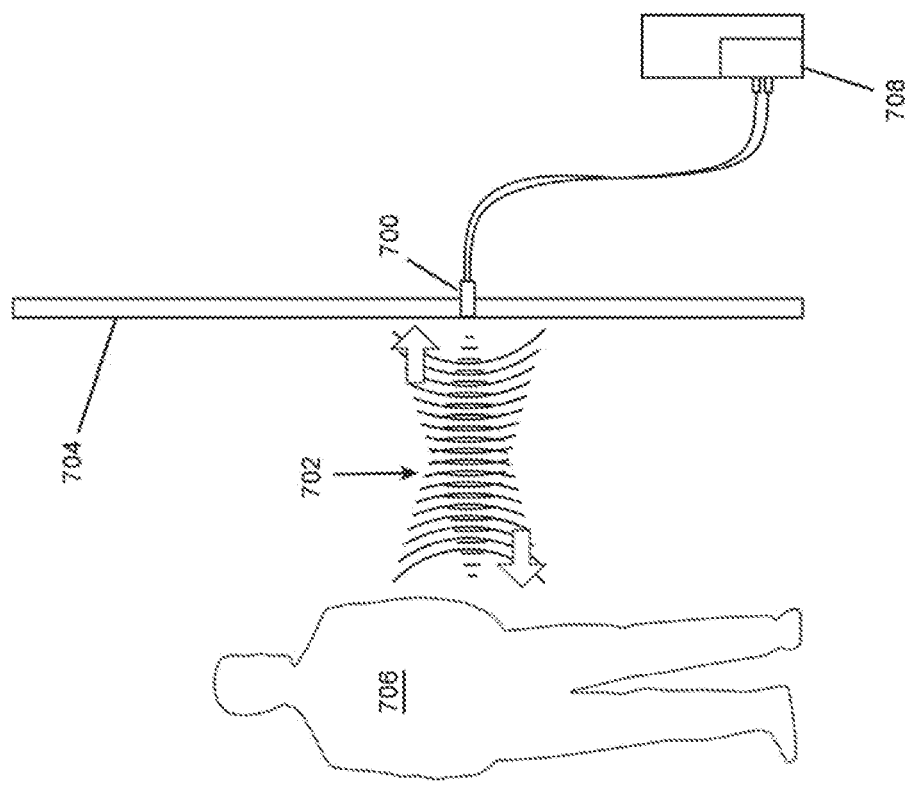

As previously mentioned, in certain embodiments, the sensor devices may include both receiving capabilities and emitting capabilities. For example as depicted collectively in FIG. 7A and FIG. 7B, a sensor 700 with both emitting and receiving capabilities emits a signal 702 from the active visual area 704. The signal bounces of a user 706 standing in front of the active visual area 704 and is received by the sensor device 700. The signal is then processed by the signal processor 708.

Figure 10:
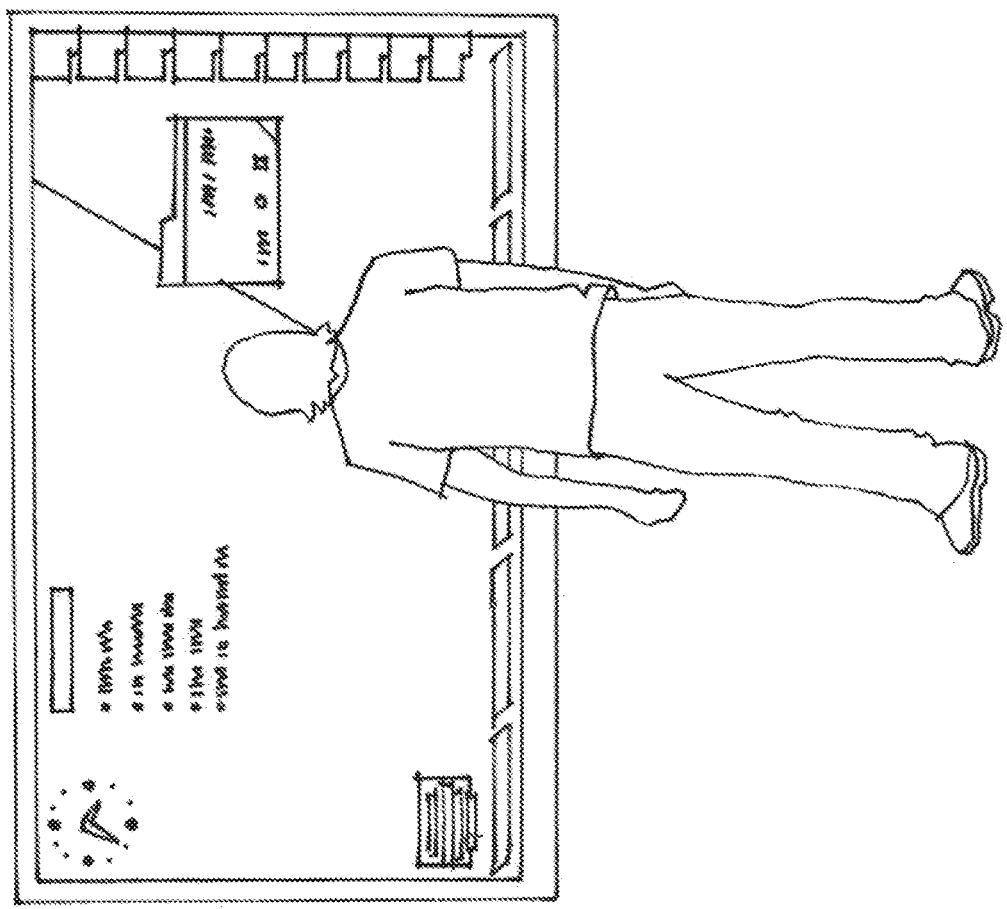
FIG. 10 is an example implementation of the present virtual presence system in accordance with an embodiment of the invention illustrated the display image area presenting information to a first viewer.

FIGS. 10-14 illustrate various environments wherein sensors are utilized for transmitting signals which are rebounded back to the sensor for sensing the presence of an object in front of the display. As shown in FIG. 10, the active area may display multiple images of varying objects such as a clock, a file folder, information contained within a file, etc. While such images are displayed to the individual in front of the image area, the person's visual image may be transferred from images captured by camera devices contained within the visual display to a remote audience. Such a configuration could be utilized to teach a remote class. The professor would have his notes before him and could manipulate the notes to assist him during his class presentation.

Figure 11:
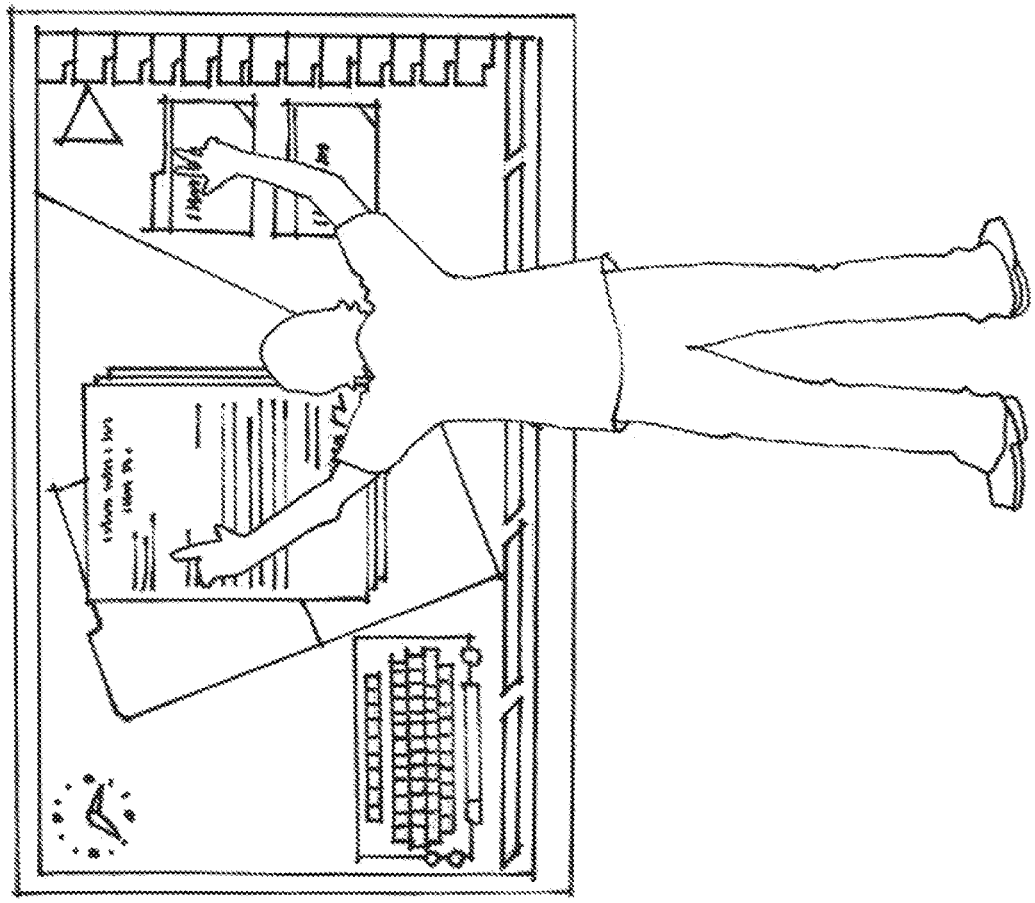
FIG. 11 is an example implementation of the present virtual presence system in accordance with an embodiment of the invention as shown in FIG. 10 with a viewer interacting with the displayed information.

FIG. 11 illustrates the professor interacting with the files as displayed in the visual image area. By manipulating his hands, the sensors sense the movement and coordinate the individuals movement with the active area of the display to enable the individual to interact with the data displayed in the image area. The detection of movement may be done by either visual or non-visual information sensed by the respective sensors. This two-fold interaction enables information to be displayed in the image area while also utilizing sensors for evaluating the movement of the individual to manipulate the data as stored by the display. By understanding what information is located where on the display screen in combination with the knowledge of where the individual is positioning his movements, data manipulation on the screen may be orchestrated by the individual. Data may be retrieved or returned to a "non-active" area, with the data "opened" in an active area. The construction of the "non-active" with "active" area may be determined by the location of the various sensors and designated the particular sensors as being associated with certain types of display parameters all coordinated by a central computer.

Figure 12:
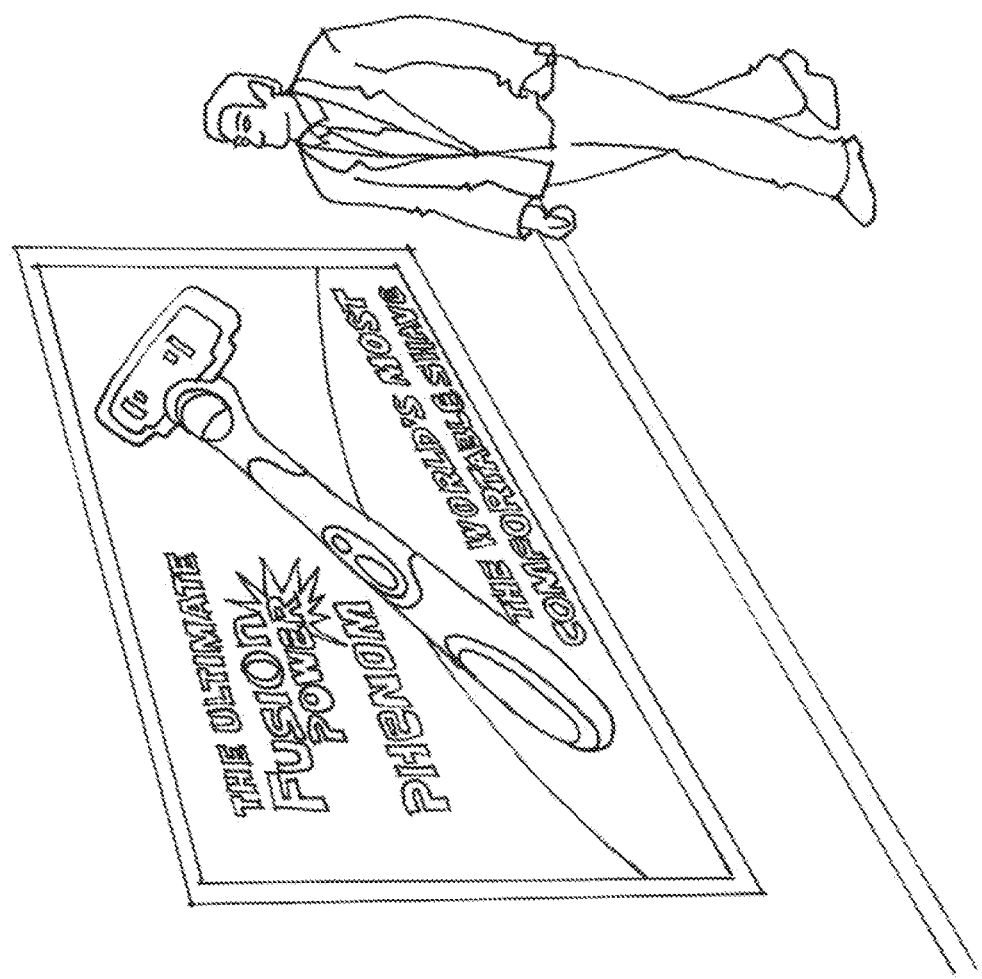
FIG. 12 is an example implementation of an advertising embodiment of the present invention.
Figure 13:
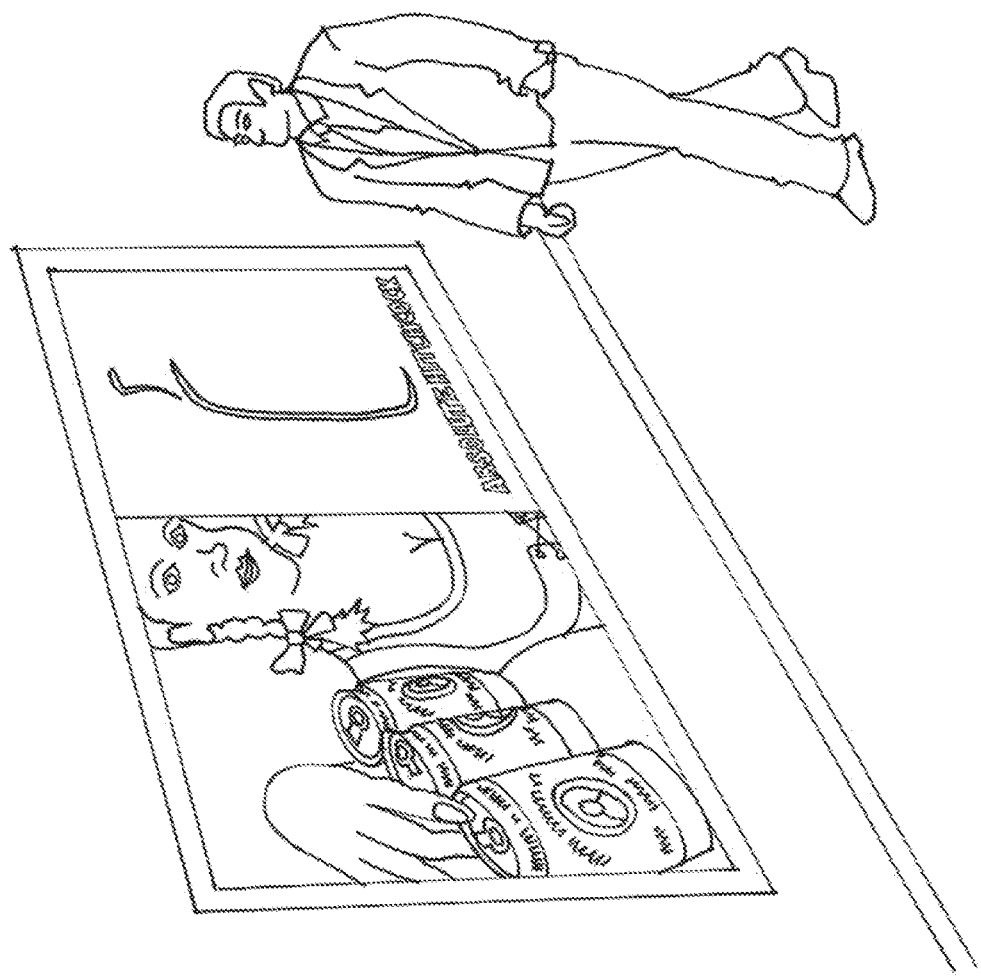
FIG. 13 is an example implementation of an advertising embodiment as shown in FIG. 12 providing real time ads based upon perceived characteristics of a passerby.

Additional "smart" displays are illustrated in FIGS. 12 and 13. As shown in FIG. 12, a particular advertisement is displayed. Sensors in the display area identify the presence of an individual within the vicinity. Various sensors may be utilized to provide a profile of the individual to determine the person height, weight, or even camera recognition may be utilized to determine if the individual is a male or female and the approximate age of the individual. With these attributes obtained by the sensors located within the display area, a second display of information providing information of a more particular nature based upon the sensed attributes of the individual may be specifically targeted to the individual. This active engagement of the display with the individual before the display is enabled by the presence of the sensors located within the display image area.

Certain embodiments of the invention can include means for transmission to and from the sensor devices. The means for transmission to the sensor devices may include, but is not limited to, a fiber optic cable, a waveguide, and/or a conduit. For example, the fiber optic cables may include a receiving end mounted to the active visual area at an aperture in the substrate, as discussed with regard to FIG. 1. Each fiber optic cable may terminate at a sensor device. For example, a charged-coupled device (CCD) sensor may be incorporated into the system.

As depicted in FIG. 8, an illustrative embodiment includes a circuit board 800 having a plurality of LED packages 802 placed on a front side 804 at a spacing of about six mm horizontally and six mm vertically. A backside 806 of the circuit board 800 includes drivers, data connections, and power connections forming the LED package 802 that enable the circuit board 800 to emit light and form a cohesive image. For example, each LED package 802 is a three mm2 plastic package that contains a red, green, and blue LED die. A six mm pixel pitch leaves three mm of empty space between each of the LED packages 802 in both the horizontal and vertical direction. During the manufacturing of the circuit board 800, a hole is fabricated into the circuit board as well as the necessary mounting bracket tree to hold a camera or the optical feed to a camera correctly in place over top of the hole. This enables the camera to look through the LED circuit board material into the space in front of the display and capture an image from that space and transfer that image to a video processor that takes the images from the cameras in the display and stitches them into one consolidated image. One such camera may include an Omnivision OV 10121 produced by OmniVision Technologies, Inc. of Santa Clara, Calif. In this embodiment, the camera is mounted to the backside of the circuit board and coupled with the appropriate lensing to enable it to capture a portion of the image in front of the display. A scanner module then multiplex together a multitude of other camera modules into a display receiver that then seamlessly merges all of the independent views into one cohesive master view.

Figure 9:
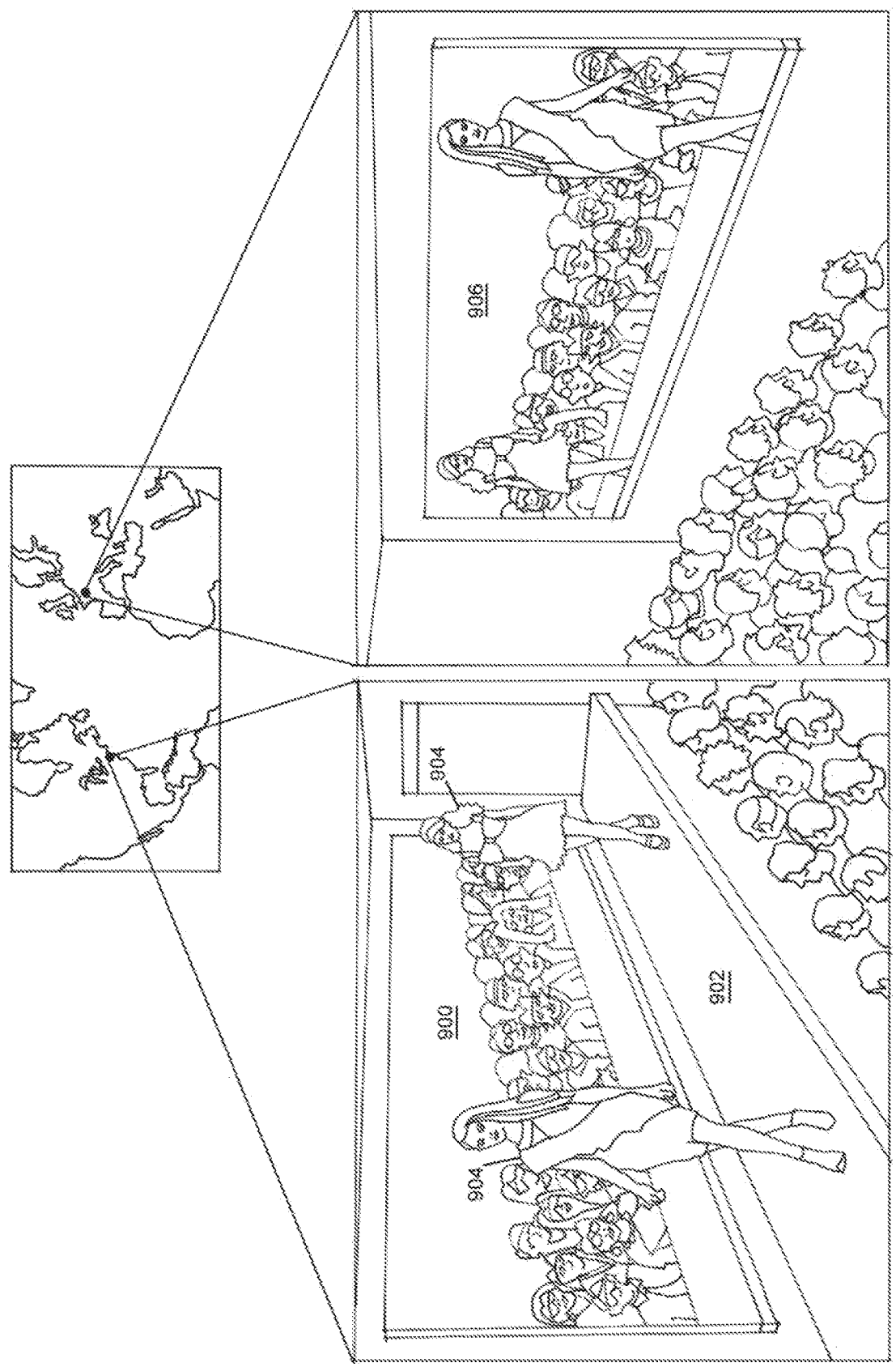
FIG. 9 is an example implementation of the present virtual presence system in accordance with an embodiment of the invention.

The present virtual presence system has been described in relation to telepresence systems. However, other applications employing displays having emitter devices or receiver devices disposed at multiple locations within the active visual area envisioned. Such applications may include telepresence systems, mirror imaging systems, security and monitoring systems (i.e., traffic counts, people flow, viewing habits, etc.) and many others. For example, as depicted in FIG. 9, the virtual presence system may be used to facilitate virtual presence at catwalk type events. As depicted, a first active visual area 900 with one or more sensors (e.g., cameras) disposed within may be positioned adjacent to a runway 902. As models 904 walk past the first active visual area 900, their image is captured. The image is then displayed in real time on a second active visual area 906 at a remote location, thereby creating a virtual presence effect of actually being next to the runway.

The present invention provides for a highly interactive visual encounter between individuals both locally and remotely. In one envisioned embodiment, a display having an active display area contains cameras located within the spaces as provided by LEDs. By positioning cameras in a dispersed manner within the area of the active display area, multiple views of individuals may be captured rendering an accurate portrayal of the individual for remote viewers. The system is intended to utilize both a local system for capturing local individuals and a remote system for displaying the captured individuals. Of course, identical systems at the local and remote sites are preferred for a realistic presentation of the individuals present at a particular viewing such as a teleconference.

An additional embodiment envisions the utilization of cameras and sensors for sensing the actions of a local individual. By locating both cameras and sensors within the active display area, the actions of the individuals may be utilized to trigger certain events to occur on the display while enabling the viewing image perceived by the remote audience to remain unchanged. By manipulating the display viewed by the local participant, the local participant may utilize the display as his own personal active board and access information displayed on various designated areas of the display. Furthermore, the display may be manipulated to change the display from the active board environment to a straight display viewing the remote audience. In some circumstances the cameras in themselves may act as sensors by detecting movement of an individual via comparison of preceding images or contrast images.

An additional embodiment envisions the utilization of cameras and sensors for sensing characteristics of a local individual for manipulating the image displayed on the active area to an image determined by the attributes sensed by the sensors. Utilizing sensors dispersed throughout the active display area creates a large area for accumulating data which may accurately portray the attributes of the individual and utilize the attributes in a database for determining a display for display.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall there between.

Although the present invention has been described in considerable detail with reference to certain preferred versions thereof, other versions are possible. It may be desirable to combine features shown in various embodiments into a single embodiment. A different number and configuration of features may be used to construct embodiments of apparatus, systems and methods that are entirely within the spirit and scope of the present disclosure. Therefor, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

The invention claimed is:

1. A display system responsive to its environment, the system comprising:
   a) a display having a structural matrix configured to arrange a plurality of spaced light emitting pixel elements, said plurality of spaced light emitting pixel elements collectively forming an active visual area wherein a first displayed image is displayable; said active visual area capable of being continuously active for continuously displaying a displayed image;
   b) at least one aperture disposed within the active visual area and among said spaced light emitting pixel elements, said aperture not obstructed by any of the said spaced light emitting pixel elements; disposed in said aperture a transmission means operative to transmit sensible data from the environment in front of said active visual area to an image capture device, the image capture device operable to capture a captured image from the environment in front of said active visual area and communicate said captured image to a signal processor;
   c) said signal processor operable to compute, from said captured image, one or more attributes, said one or more attributes comprising an attribute indicating a presence of one or more persons in said captured image;
   d) said signal processor being further operative to initiate the display of a second displayed image in response to computing said attribute indicating the presence of one or more persons in said captured image;
   e) said signal processor is further operative to compute, from said captured image, an attribute indicating a gender of said one or more persons in said captured image;
   f) the signal processor is further operative to initiate the display of said second displayed image in response to computing at least two attributes, the at least two attributes comprising: said attribute indicating the presence of one or more persons in said captured image; and, said attribute indicating the gender of said one or more persons in said captured image.

2. The system of claim 1 further characterized in that the transmission means is one selected from the list consisting of {fiber optic cable, waveguide, conduit}.

3. The system of claim 1 further characterized in that:
   a) the image capture device is operable to capture a sequence of captured images;
   b) the signal processor is further operable to compute, from said sequence of captured images, an attribute indicating a motion of one or more persons in said sequence of captured images;
   c) the signal processor is further operative to initiate the display of said second displayed image in response to computing at least two attributes, the at least two attributes comprising: said attribute indicating the presence of one or more persons in said captured image; and, said attribute indicating the motion of one or more persons in said sequence of captured images.

4. The system of claim 1 further characterized in that:
   a) the signal processor is further operative to compute, from said captured image, an attribute indicating a weight of said one or more persons in said captured image;
   b) the signal processor is further operative to initiate the display of said second displayed image in response to computing at least two attributes, the at least two attributes comprising: said attribute indicating the presence of one or more persons in said captured image; and, said attribute indicating the weight of said one or more persons in said captured image.

5. A display system responsive to its environment, the system comprising:
   a) a display having a structural matrix configured to arrange a plurality of spaced light emitting pixel elements, said plurality of spaced light emitting pixel elements collectively forming an active visual area wherein a first displayed image is displayable; said active visual area capable of being continuously active for continuously displaying a displayed image;
   b) at least one aperture disposed within the active visual area and among said spaced light emitting pixel elements, said aperture not obstructed by any of the said spaced light emitting pixel elements; disposed in said aperture a transmission means operative to transmit sensible data from the environment in front of said active visual area to an image capture device, the image capture device operable to capture a captured image from the environment in front of said active visual area and communicate said captured image to a signal processor;
   c) said signal processor operable to compute, from said captured image, one or more attributes, said one or more attributes comprising an attribute indicating a presence of one or more persons in said captured image;
   d) said signal processor being further operative to initiate the display of a second displayed image in response to computing said attribute indicating the presence of one or more persons in said captured image;
   e) said signal processor is further operative to compute, from said captured image, an attribute indicating an age of said one or more persons in said captured image;
   f) the signal processor is further operative to initiate the display of said second displayed image in response to computing at least two attributes, the at least two attributes comprising: said attribute indicating the presence of one or more persons in said captured image; and, said attribute indicating the age of said one or more persons in said captured image.

6. The system of claim 5 further characterized in that the transmission means is one selected from the list consisting of {fiber optic cable, waveguide, conduit}.

7. The system of claim 5 further characterized in that:
   a) the image capture device is operable to capture a sequence of captured images;

b) the signal processor is further operable to compute, from said sequence of captured images, an attribute indicating a motion of one or more persons in said sequence of captured images;

c) the signal processor is further operative to initiate the display of said second displayed image in response to computing at least two attributes, the at least two attributes comprising: said attribute indicating the presence of one or more persons in said captured image; and, said attribute indicating the motion of one or more persons in said sequence of captured images.

8. The system of claim 5 further characterized in that:

a) the signal processor is further operative to compute, from said captured image, an attribute indicating a weight of said one or more persons in said captured image;

b) the signal processor is further operative to initiate the display of said second displayed image in response to computing at least two attributes, the at least two attributes comprising: said attribute indicating the presence of one or more persons in said captured image; and, said attribute indicating the weight of said one or more persons in said captured image.

9. A display system responsive to its environment, the system comprising:

a) a display having a structural matrix configured to arrange a plurality of spaced light emitting pixel elements, said plurality of spaced light emitting pixel elements collectively forming an active visual area wherein a first displayed image is displayable; said active visual area capable of being continuously active for continuously displaying a displayed image;

b) at least one aperture disposed within the active visual area and among said spaced light emitting pixel elements, said aperture not obstructed by any of the said spaced light emitting pixel elements; disposed in said aperture a transmission means operative to transmit sensible data from the environment in front of said active visual area to an image capture device, the image capture device operable to capture a captured image from the environment in front of said active visual area and communicate said captured image to a signal processor;

c) said signal processor operable to compute, from said captured image, one or more attributes, said one or more attributes comprising an attribute indicating a presence of one or more persons in said captured image;

d) said signal processor being further operative to initiate the display of a second displayed image in response to computing said attribute indicating the presence of one or more persons in said captured image;

e) the signal processor is further operative to compute, from said captured image, an attribute indicating a height of said one or more persons in said captured image;

f) the signal processor is further operative to initiate the display of said second displayed image in response to computing at least two attributes, the at least two attributes comprising: said attribute indicating the presence of one or more persons in said captured image; and, said attribute indicating the height of said one or more persons in said captured image.

10. The system of claim 9 further characterized in that the transmission means is one selected from the list consisting of {fiber optic cable, waveguide, conduit}.

11. The system of claim 9 further characterized in that:

a) the image capture device is operable to capture a sequence of captured images;

b) the signal processor is further operable to compute, from said sequence of captured images, an attribute indicating a motion of one or more persons in said sequence of captured images;

c) the signal processor is further operative to initiate the display of said second displayed image in response to computing at least two attributes, the at least two attributes comprising: said attribute indicating the presence of one or more persons in said captured image; and, said attribute indicating the motion of one or more persons in said sequence of captured images.

12. The system of claim 9 further characterized in that:

a) the signal processor is further operative to compute, from said captured image, an attribute indicating a weight of said one or more persons in said captured image;

the signal processor is further operative to initiate the display of said second displayed image in response to computing at least two attributes, the at least two attributes comprising: said attribute indicating the presence of one or more persons in said captured image; and, said attribute indicating the weight of said one or more persons in said captured image.

* * * * *